(12) United States Patent
Neumann

(10) Patent No.: US 12,243,524 B2
(45) Date of Patent: Mar. 4, 2025

(54) ASSISTANCE DEVICE, CONVERSATION CONTROL DEVICE, AND PROGRAM

(71) Applicant: EASY DIALOG G.K., Tokyo (JP)

(72) Inventor: Christoph Neumann, Tokyo (JP)

(73) Assignee: EASY DIALOG G.K., Tokyo (JP)

( * ) Notice: Subject to any disclaimer, the term of this patent is extended or adjusted under 35 U.S.C. 154(b) by 311 days.

(21) Appl. No.: 17/996,980

(22) PCT Filed: Apr. 23, 2021

(86) PCT No.: PCT/JP2021/016535
§ 371 (c)(1),
(2) Date: Oct. 24, 2022

(87) PCT Pub. No.: WO2021/215540
PCT Pub. Date: Oct. 28, 2021

(65) Prior Publication Data
US 2023/0335128 A1    Oct. 19, 2023

Related U.S. Application Data

(60) Provisional application No. 63/014,721, filed on Apr. 24, 2020.

(51) Int. Cl.
*G10L 21/00*    (2013.01)
*G10L 15/22*    (2006.01)
*G10L 25/00*    (2013.01)

(52) U.S. Cl.
CPC ........ *G10L 15/22* (2013.01); *G10L 2015/225* (2013.01)

(58) Field of Classification Search
None
See application file for complete search history.

(56) References Cited

U.S. PATENT DOCUMENTS 10,339,930 B2 *   7/2019   Kawahara ............... G10L 15/26
10,347,244 B2 *   7/2019   Goel ........................ G10L 15/26
(Continued)

FOREIGN PATENT DOCUMENTS

JP    2010073192 A    4/2010
JP    2018032912 A    3/2018
(Continued)

OTHER PUBLICATIONS

"International Application No. PCT/JP2021/016535, International Search and Written Opinion mailed Jul. 6, 2021", (Jul. 6, 2021), 9 pgs.

*Primary Examiner* — Satwant K Singh
(74) *Attorney, Agent, or Firm* — Schwegman Lundberg & Woessner, P.A.

(57) ABSTRACT

An assistance device that assists with the generation of a computer program for controlling operations of a device to be controlled, the assistance device including an output control unit that controls operations of an output unit that outputs an utterance inputted into an input unit that receives an input of an utterance which is information outputted by an output source, wherein, in a case in which information indicating an event that has a possibility of occurring in a human-device conversation, that is, an interaction between the device to be controlled and a user of the device to be controlled, is inputted, the output control unit causes the output unit to output an event indicating the inputted information, and in a case in which information indicating an event that has a possibility of occurring in an (N−1)th place (where N is an integer equal to or greater than 1) during the human-device conversation is inputted into the input unit, the output control unit causes the output unit to output information prompting for an input of information indicating (Continued)

an event that has a possibility of occurring in the Nth place during the human-device conversation.

5 Claims, 11 Drawing Sheets

(56) References Cited

U.S. PATENT DOCUMENTS

| | | | | |
|---|---|---|---|---|
| 10,817,787 | B1* | 10/2020 | Zhang | G06F 40/295 |
| 11,004,013 | B2* | 5/2021 | Eisenzopf | G06N 20/00 |
| 11,158,311 | B1* | 10/2021 | Zhang | G06F 40/284 |
| 11,183,170 | B2* | 11/2021 | Iwase | G10L 15/22 |
| 2020/0075027 | A1* | 3/2020 | Arantes | G06Q 50/40 |

FOREIGN PATENT DOCUMENTS

| | | |
|---|---|---|
| JP | 2018055385 A | 4/2018 |
| WO | WO-2021215540 A1 | 10/2021 |

\* cited by examiner

ASSISTANCE DEVICE, CONVERSATION CONTROL DEVICE, AND PROGRAM

PRIORITY CLAIM TO RELATED APPLICATIONS

This application is a U.S. national stage filing under 35 U.S.C. § 371 from International Application No. PCT/JP2021/016535, filed on 23 Apr. 2021, and published as WO2021/215540 on 28 Oct. 2021, which claims the benefit under 35 U.S.C. 119 (e) to U.S. Provisional Application No. 63/014,721, filed on 24 Apr. 2020, the benefit of priority of each of which is claimed herein, and which applications and publication are hereby incorporated herein by reference in their entirety.

TECHNICAL FIELD

Background Art

There are devices that play music and communicate information such as the weather according to a voice instruction from a user.

CITATION LIST

Patent Literature

[Patent Literature 1] International Publication No. WO 2019/228667

SUMMARY OF INVENTION

Technical Problem

Such a technology is a technology of interaction between a device and a person. Accordingly, there are persons with a variety of different ideas about how the interaction is to take place. However, there are also many persons who may have ideas but are unfamiliar with the computer program that controls the device, and in some cases, such persons may have a heavy burden of implementing their ideas.

In light of the above circumstances, an objective of the present invention is to provide a technology that lessens the burden of the labor required to implement a technology of interaction between a device and a person.

Solution to Problem

One aspect of the present invention is an assistance device that assists with the generation of a computer program for controlling operations of a device to be controlled, the assistance device including an output control unit that controls operations of an output unit that outputs an utterance inputted into an input unit that receives an input of an utterance which is information outputted by an output source, wherein in a case in which information indicating an event that has a possibility of occurring in a human-device conversation, that is, an interaction between the device to be controlled and a user of the device to be controlled, is inputted, the output control unit causes the output unit to output an event indicating the inputted information, and in a case in which information indicating an event that has a possibility of occurring in an (N−1)th place (where N is an integer equal to or greater than 1) during a human-device conversation is inputted into the input unit, the output control unit causes the output unit to output information prompting for an input of information indicating an event that has a possibility of occurring in the Nth place during the human-device conversation.

Advantageous Effect of Invention

According to the present invention, it is possible to lessen the burden of the labor required to implement a technology of interaction between a device and a person.

DESCRIPTION OF EMBODIMENT

Figure 1:
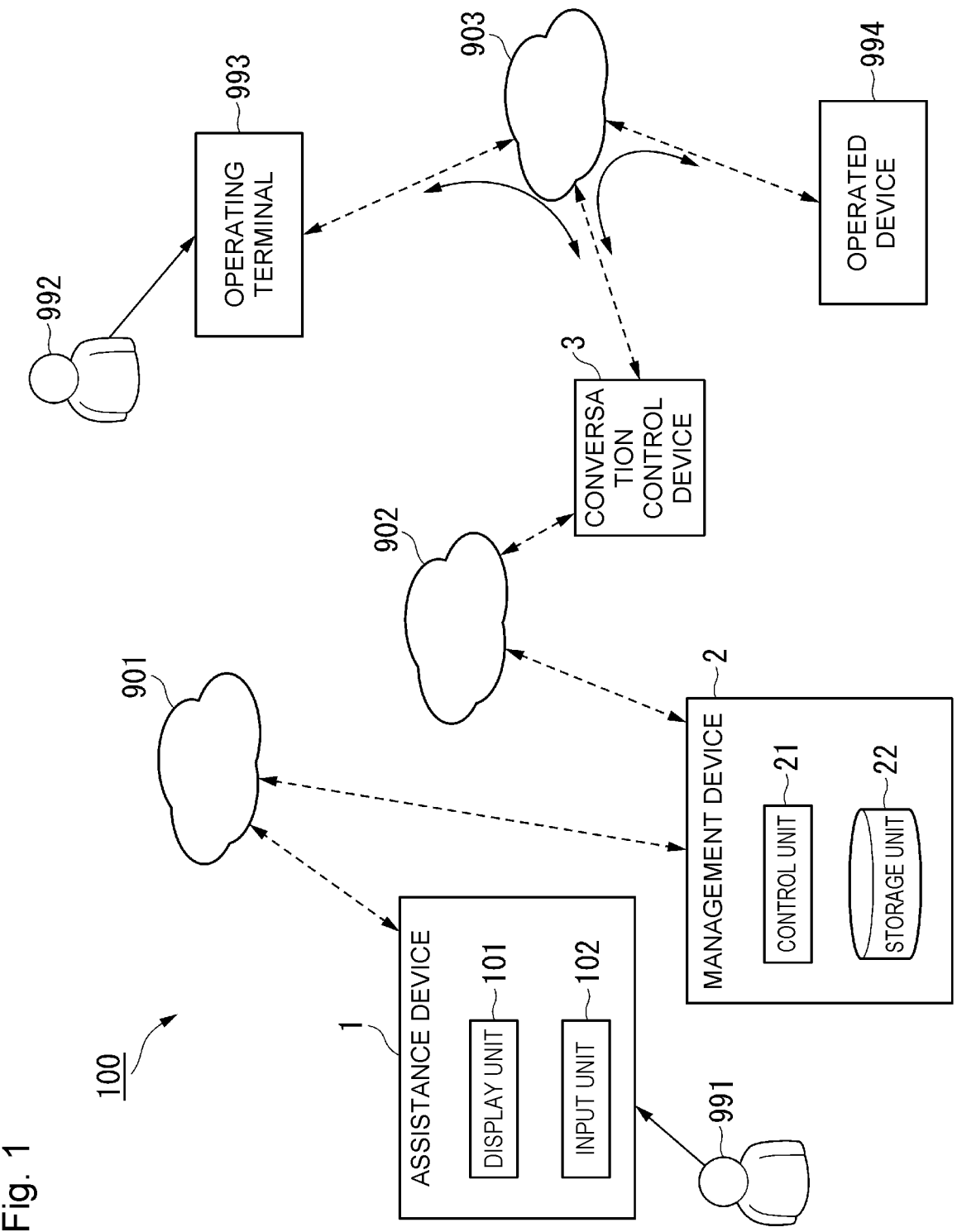
FIG. 1 is a diagram illustrating an example of the configuration of an assistance system 100 according to an embodiment.

FIG. 1 is a diagram illustrating an example of the configuration of an assistance system 100 according to an embodiment. The assistance system 100 is provided with an assistance device 1, a management device 2, and a conversation control device 3.

The assistance device 1 provides design assistance to a designer 991 of a computer program for controlling the operations of a device to be controlled. In the present embodiment, the "computer program" to be designed includes not only so-called program code, but also the values of parameters and tables to be referenced in the execution of the program. For this reason, in the present embodiment, the design of the computer program includes not only the generation of program code, but also the determination of parameter values and the generation of tables to be referenced in the execution of the program. The device to be controlled is a smart speaker, for example. The device to be controlled may also be a guide robot or a security robot, for example. The operating terminal 993 and operated device 994 in FIG. 1 are examples of the device to be controlled.

The assistance device 1 is provided with a display unit 101 and an input unit 102. The display unit 101 is configured to include a display device such as a cathode ray tube (CRT) display, a liquid crystal display, or an organic electroluminescence (EL) display. The display unit 101 may also be configured to include an interface that connects these display devices to the assistance device 1. The input unit 102 is configured to include an input device such as a mouse and keyboard or a touch panel, for example. The input unit 102 may also be configured to include an interface that connects these input devices to the assistance device 1.

Figure 2:
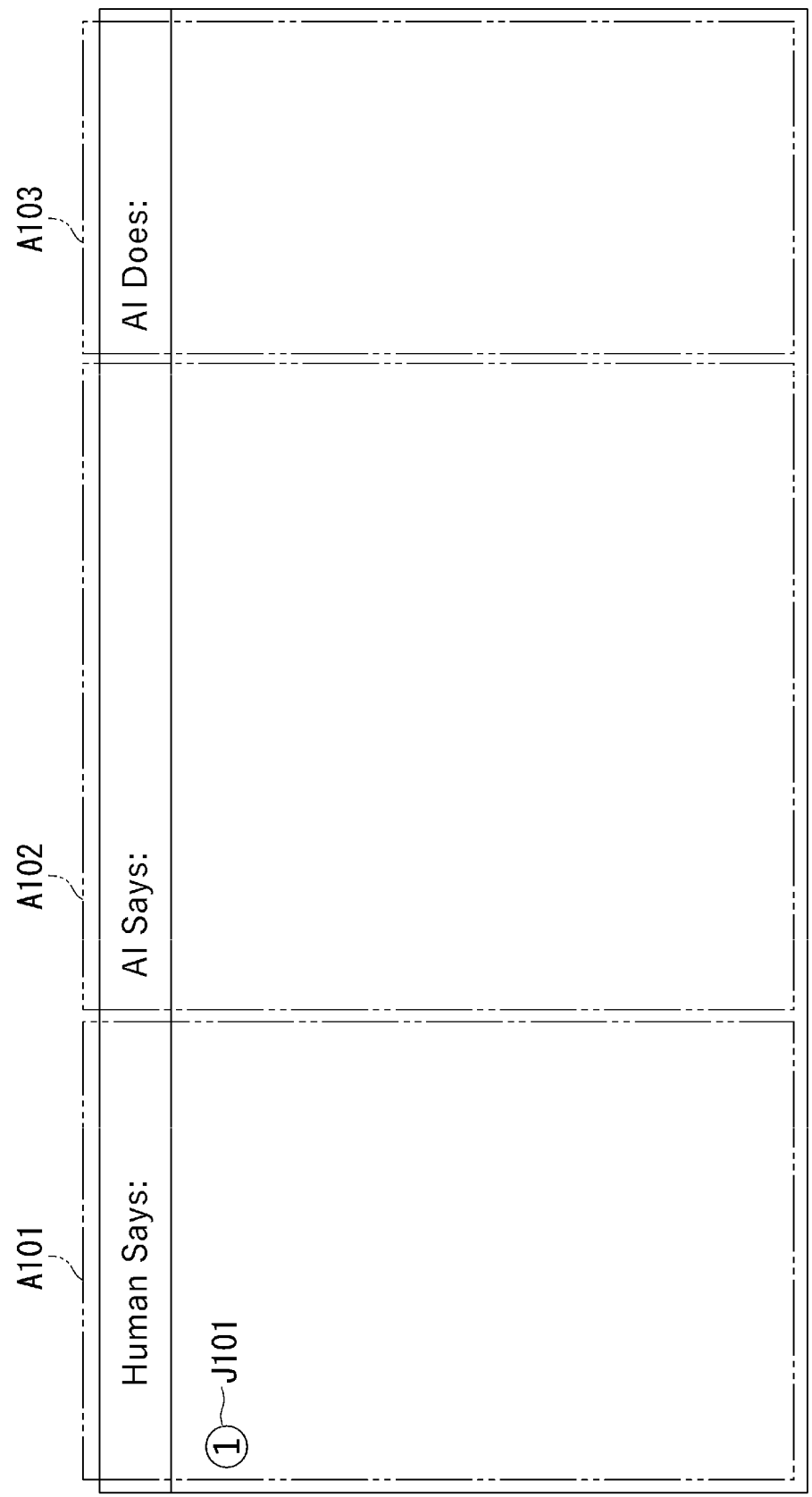
FIG. 2 is a first diagram illustrating an example of a screen displayed by a display unit 101 in the embodiment.

FIGS. 2 to 6 will be used to illustrate examples of screens displayed by the display unit 101. FIG. 2 is a first diagram illustrating an example of a screen displayed by the display unit 101 in the embodiment. On the screen displayed by the display unit 101, an area A101, an area A102, and an area A103 exist.

The area A101 is an area where an inputted received utterance is displayed when a received utterance is inputted into the input unit 102. A received utterance is an utterance that has a possibility of being inputted into the device to be controlled during an interaction (hereinafter referred to as a "human-device conversation") between the device to be controlled and a user 992 of the device to be controlled (hereinafter referred to as the "user 992").

A "human-device conversation" is an event that occurs repeatedly due to the immediately preceding occurrence, in each turn, of one of three types of events: a received utterance occurrence event; a given utterance occurrence event; and a response process execution event. The received utterance occurrence event is an event in which the user 992 inputs an utterance into the device to be controlled. The given utterance occurrence event is an event in which the device to be controlled outputs an utterance. The response process execution event is an event in which the device to be controlled executes a process (hereinafter referred to as the "response process") in response to an inputted utterance. Note that an utterance refers to a combination of one or multiple linguistic parts of any length, from a single word to a long sentence.

The received utterance is, for example, the utterance "Please let me know tomorrow's weather". In FIG. 2, "Human Says:" is an example of information indicating that the area is for displaying the received utterance.

The area A102 is an area where an inputted given utterance is displayed when a given utterance is inputted into the input unit 102. A given utterance is an utterance that has a possibility of being outputted by the device to be controlled during a human-device conversation. For instance, in the case where the received utterance is "Please let me know tomorrow's weather", the given utterance is the utterance "Tomorrow will be sunny", for example. In FIG. 2, "AI Says:" is an example of information indicating that the area is for displaying the given utterance.

The area A103 is an area where the content of a response process indicated by inputted information related to a candidate of the response process (hereinafter referred to as "response process candidate information") is displayed when response process candidate information is inputted into the input unit 102. For instance, in the case where the received utterance is the utterance "Please play Spring from The Four Seasons by Vivaldi", the candidate of the response process is an operation for playing "Spring" from "The Four Seasons" by Vivaldi.

In the case where, for example, the received utterance is the utterance "Please play Spring from The Four Seasons by Vivaldi" but data for the music of "Spring" from "The Four Seasons" by Vivaldi cannot be retrieved, the candidate of the response process may also be an operation for searching for another piece of music that is similar, another piece of music by Vivaldi, another piece of music that suggests "spring", or the like, and playing the retrieved piece of music. In this case, the utterance "I could not find that piece of music" may also be defined to be produced additionally as the given utterance in the area A102. In FIG. 2, "AI Does:" is an example of information indicating that the area is for displaying information indicating the candidate of the response process.

On the screen displayed by the display unit 101, information prompting the designer 991 for the input of information indicating a first event that has the possibility of occurring during a human-device conversation is displayed. In FIG. 2, the information J101 is an example of information prompting the designer 991 for the input of information indicating a first event that has the possibility of occurring during a human-device conversation.

Figure 3:
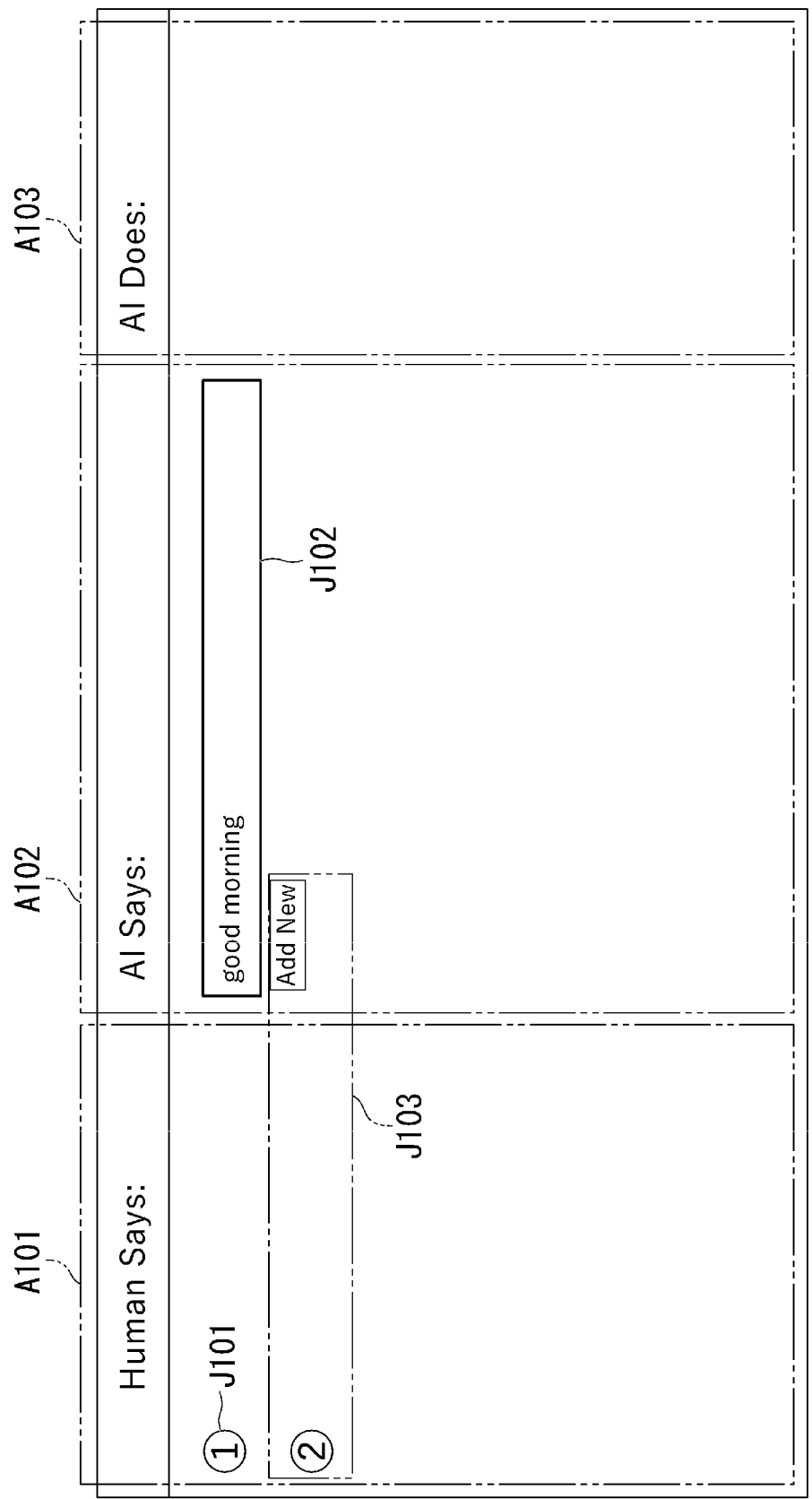
FIG. 3 is a second diagram illustrating an example of a screen displayed by a display unit 101 in the embodiment.

FIG. 3 is a second diagram illustrating an example of a screen displayed by the display unit 101 in the embodiment. FIG. 3 illustrates the result of inputting the utterance "good morning" as the given utterance into the input unit 102 in the state displayed on the screen in FIG. 2. Since the utterance "good morning" has been inputted as the given utterance into the input unit 102, the given utterance inputted into the area A102, that is, the utterance "good morning", is displayed on the screen in FIG. 3. The information J102 in FIG. 3 is an example of information indicating the inputted given utterance.

The inputted utterance "good morning" is an utterance inputted when the screen of the display unit 101 is the screen in FIG. 2. Consequently, "good morning" that has been inputted as the given utterance is an utterance produced by a first event in a human-device conversation, and is an utterance outputted by the device to be controlled. To indicate this to the designer 991, the utterance "good morning" is displayed on the screen in FIG. 3 at a position where the position in the height direction on the screen is the same as the information J101.

FIG. 3 illustrates information J103. The information J103 is an example of information prompting the designer 991 for the input of information indicating a second event that has the possibility of occurring during a human-device conversation.

Figure 4:
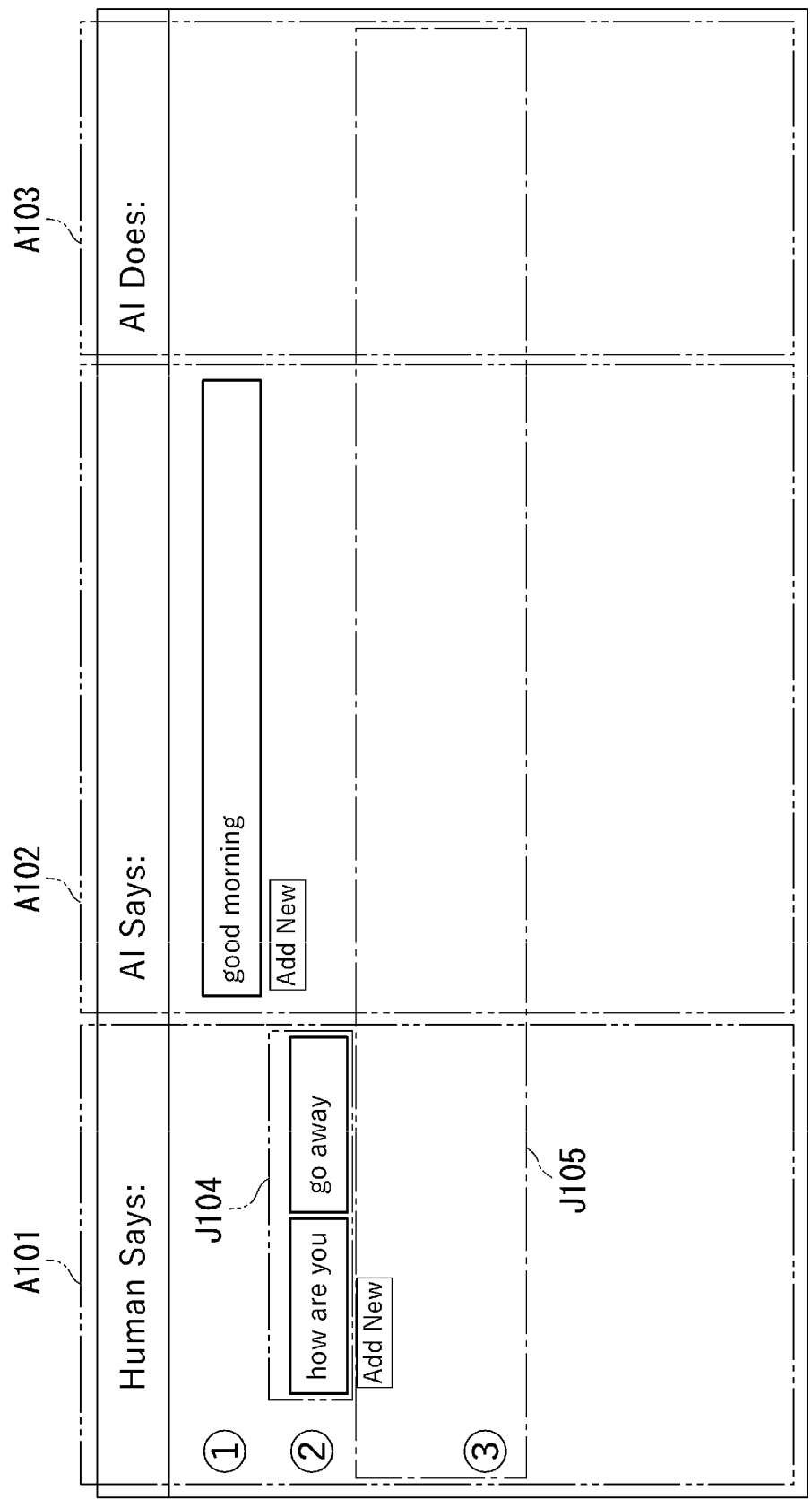
FIG. 4 is a third diagram illustrating an example of a screen displayed by a display unit 101 in the embodiment.

FIG. 4 is a third diagram illustrating an example of a screen displayed by the display unit 101 in the embodiment. FIG. 4 illustrates the result of inputting the utterance "how are you" and the utterance "go away" as received utterances into the input unit 102 in the state displayed on the screen in FIG. 3. Since "how are you" and "go away" have been inputted as the received utterances into the input unit 102, the inputted received utterances "how are you" and "go away" are displayed in the area A101 of the screen in FIG. 4. By defining multiple received utterances in this way, the flow of the conversation can be branched. Both "how are you" and "go away" inputted as the received utterances are utterances that have the possibility of being inputted by the user 992 into the device to be controlled. The information J104 in FIG. 4 is an example of information indicating the inputted received utterances. The user 992 may also input utterances with the same or similar meaning as received utterances. Additionally, for example, in response to "how are you", "fine" may be defined as a given utterance. For example, in response to "go away", the current time may be acquired by the response process candidate without defining a given utterance, and as the next operation, "good morning" may be defined as the given utterance if the current time is in a morning time period, whereas not performing an operation may be defined if the current time is not in the morning time period.

FIG. 4 illustrates information J105. The information J105 is an example of information prompting the designer 991 for the input of information indicating a third event that has the possibility of occurring during a human-device conversation.

Figure 5:
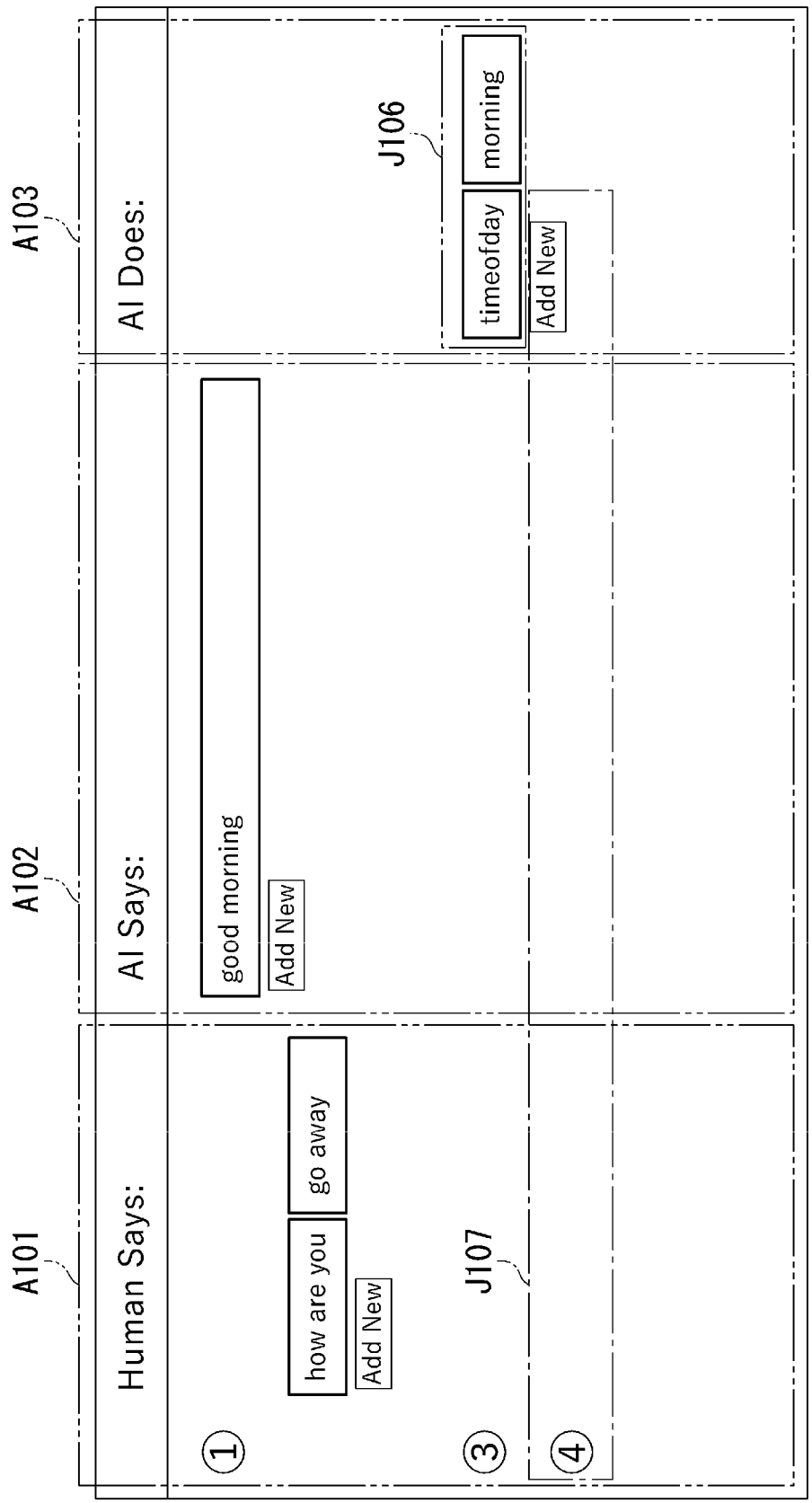
FIG. 5 is a fourth diagram illustrating an example of a screen displayed by a display unit 101 in the embodiment.

FIG. 5 is a fourth diagram illustrating an example of a screen displayed by the display unit 101 in the embodiment. FIG. 5 illustrates the result of inputting the character string "timeofday" and the character string "morning" as response process candidate information in the state displayed on the screen in FIG. 4. Information J106 is an example of response process candidate information displayed on the screen.

Here, "timeofday" and "morning" are information indicating operations of the device to be controlled, but are not computer programs directing the operations. Both "timeofday" and "morning" are notes by the designer 991 regarding the kinds of processes to be executed by the device to be controlled. The response process candidate information may also be the program itself for a process that has the possibility of being executed by the device to be controlled, and may also be a note related to a process that has the possibility of being executed by the device to be controlled like in the example of FIG. 5. When a plurality of response process candidates exist in this way, the flow of the conversation may be branched. In this case, branches are defined in the data (interaction flow information) to be outputted. For example, two or more branches are defined according to the result of the process referred to as "timeofday".

The response process candidate information may also be a note, and therefore the designer 991 can record the content of a process that has the possibility of being executed by the device to be controlled as a note, even if the designer 991 is unable to generate a computer program for controlling the device to be controlled. The content of the note is viewable by a person who has the skills to generate a computer program for controlling the device to be controlled. For this reason, even if the designer 991 personally is unable to generate a computer program for controlling the device to be controlled, the designer 991 can generate a computer program with help from another who does have the skills.

FIG. 5 illustrates information J107. The information J107 is an example of information prompting the designer 991 for the input of information indicating a fourth event that has the possibility of occurring during a human-device conversation.

Figure 6:
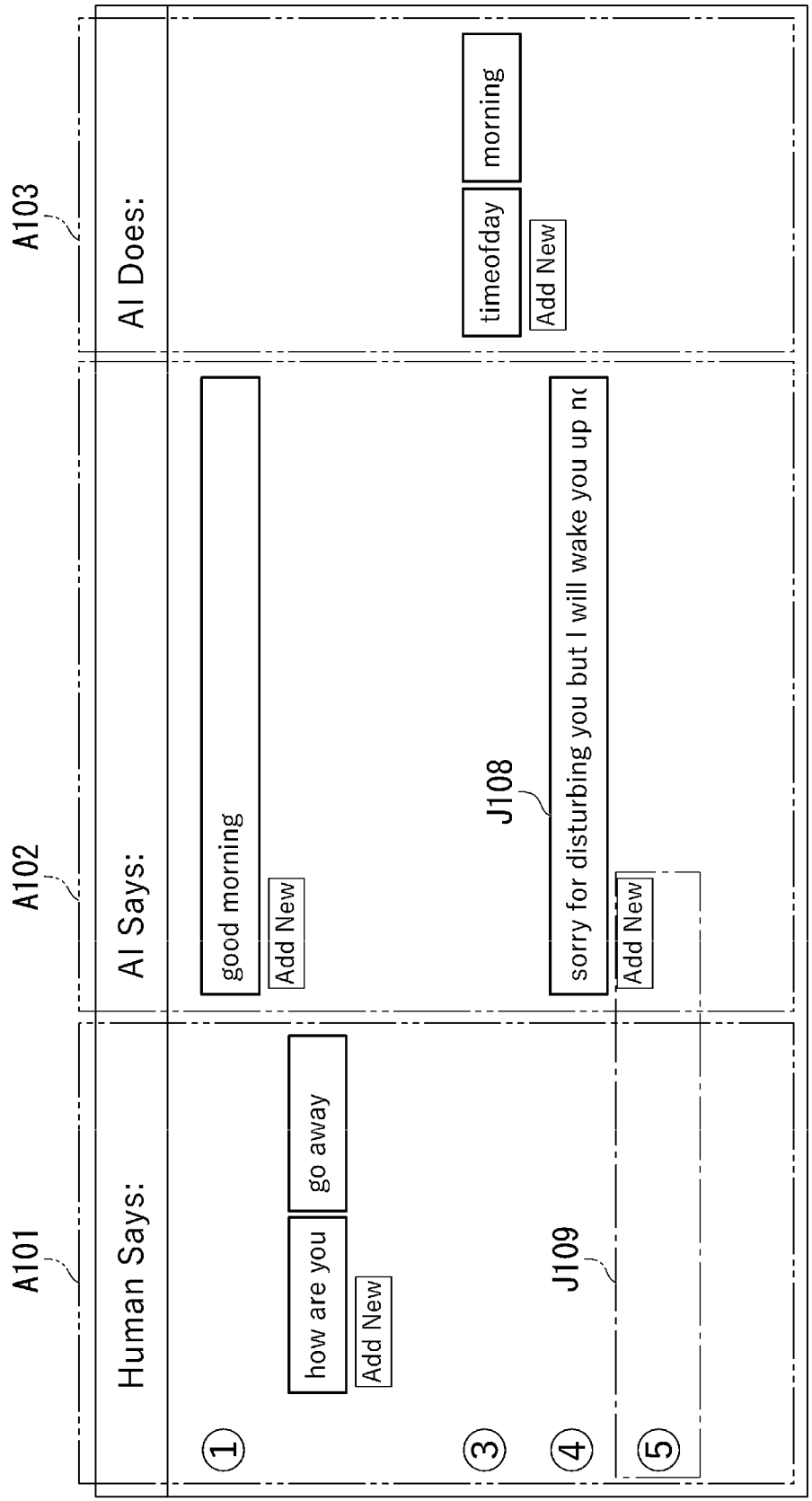
FIG. 6 is a fifth diagram illustrating an example of a screen displayed by a display unit 101 in the embodiment.

FIG. 6 is a fifth diagram illustrating an example of a screen displayed by the display unit 101 in the embodiment. FIG. 6 illustrates the result of inputting the character string "sorry for disturbing you but I will wake you up now" as the given utterance into the input unit 102 in the state displayed on the screen in FIG. 5. Since "sorry for disturbing you but I will wake you up now" has been inputted as the given utterance into the input unit 102, the inputted given utterance "sorry for disturbing you but I will wake you up now" is displayed in the area A102 of the screen in FIG. 6. The information J108 in FIG. 6 is an example of information indicating the inputted given utterance.

FIG. 6 illustrates information J109. The information J109 is an example of information prompting the designer 991 for the input of information indicating a fifth event that has the possibility of occurring during a human-device conversation.

In this way, in the case where information indicating an event that has the possibility of occurring in the (N−1)th place during a human-device conversation is inputted into the input unit 102, the display unit 101 displays information prompting for the input of information indicating an event that has the possibility of occurring in the Nth place during the human-device conversation. Here, N is an integer equal to or greater than 1. Note that such a number (for example, N) does not necessarily have to be displayed by the display unit 101.

The assistance device 1 generates interaction flow information based on the information inputted into the input unit 102. The interaction flow information is text data information indicating the flow of events occurring in a human-device conversation. One example of the flow is the flow of events occurring in the human-device conversation anticipated by the designer 991 and exemplified in FIGS. 2 to 6. Consequently, the assistance device 1 prompts the designer 991 for the input of information indicating events that have the possibility of occurring in a human-device conversation, displays the content of the inputted events, and generates interaction flow information indicating the flow of the occurrence of the inputted events.

The interaction flow information includes at least turn information, executing entity information, and content information. The turn information indicates the turn in which each of the events, namely received utterance occurrence events, given utterance occurrence events, and response process execution events, occurs during a human-device conversation.

The executing entity information is information indicating the entity that causes the event to occur in each turn indicated by the turn information. For example, for a received utterance occurrence event, the executing entity information indicates the input origin, such as the user 992, that inputs the received utterance into the device to be controlled. For example, for a given utterance occurrence event, the executing entity information indicates the device to be controlled which is the entity that outputs the given utterance. For example, for a response process execution event, the executing entity information indicates the device to be controlled with is the entity that executes the candidate of the response process indicated by the response process execution information.

The content information indicates the content of the event in each turn indicated by the turn information. For example, for a received utterance occurrence event, the content information indicates the utterance itself of the received utterance. For example, for a given utterance occurrence event, the content information indicates the utterance itself of the given utterance. For example, for a response process execution event, the content information indicates the candidate of the response process indicated by the response process execution information.

Note that the numerals indicated by the information J101, the information J103, the information J105, the information J107, and the information J109 in FIGS. 2 to 6 denote the turns by which the events occur in a human-device conversation. Accordingly, the information J101, the information J103, the information J105, the information J107, and the information J109 are an example of the turn information. In this way, the display unit 101 may display the turn information. Moreover, the interaction flow information may also be removed individually or inserted partway through. Moreover, interaction flow information about a subsequent process may be defined in common for a plurality of interaction flow information. Also, the numerical sequence of the displayed numerals does not necessarily have to follow the order of operations.

Figure 7:
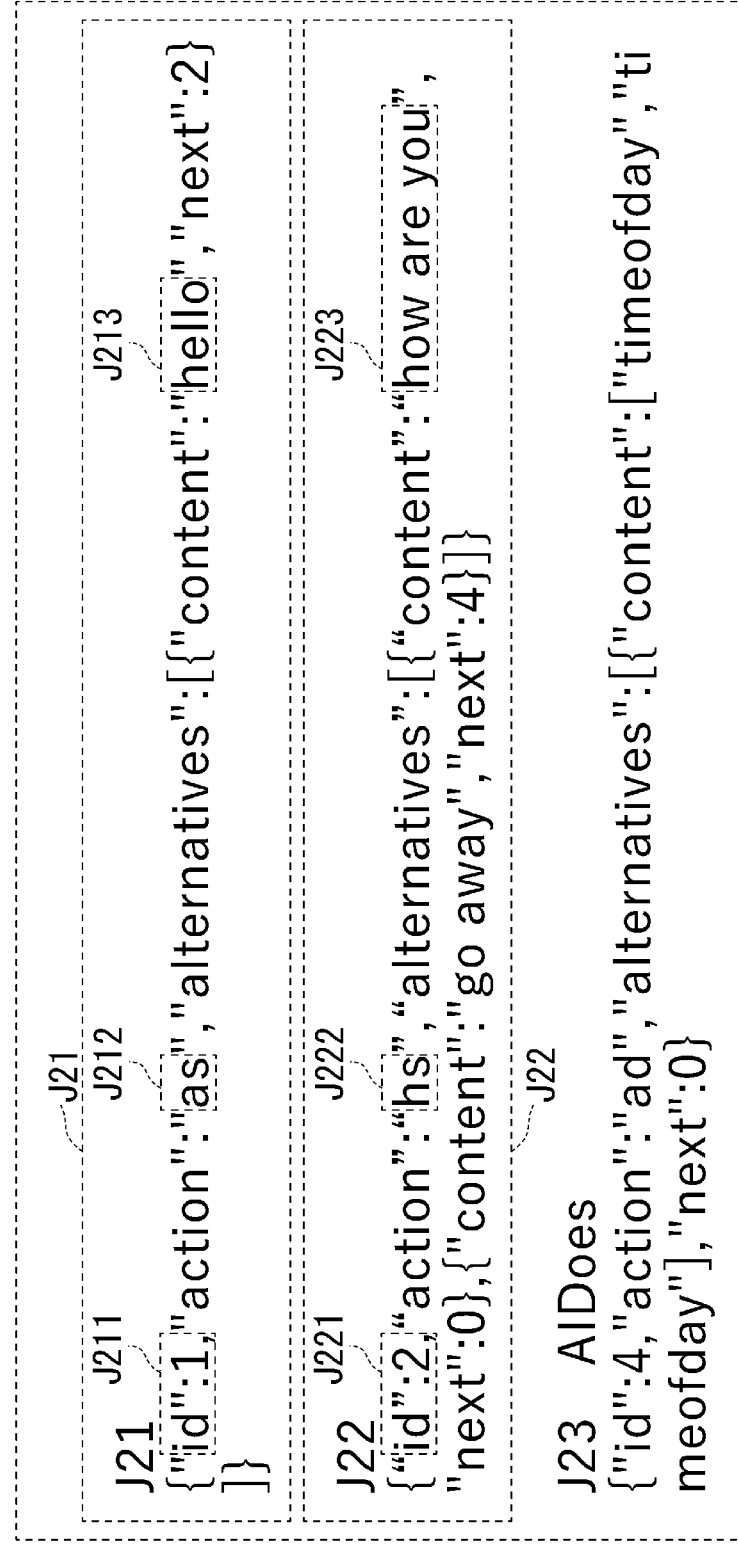
FIG. 7 is a diagram illustrating an example of interaction flow information according to an embodiment.

FIG. 7 is a diagram illustrating an example of interaction flow information according to an embodiment. FIG. 7 illustrates information J21, information J22, and information J23. The information J21, the information J22, and the information J23 are pieces of information relating to events that occur in an interaction between the device to be controlled and the user 992. The information illustrated in FIG. 7 is a specific example of the interaction flow information in the processes described in FIGS. 2 to 6.

The information J21 indicates an event that occurs first in an interaction between the device to be controlled and the user 992. Information J211 indicates that the information J21 is information relating to an event that occurs first in an interaction between the device to be controlled and the user 992. The information J211 in FIG. 7 is an example of turn information. Information J212 in FIG. 7 indicates that the device to be controlled is the entity of the event that occurs first in an interaction between the device to be controlled and the user 992. The information J212 in FIG. 7 is an example of executing entity information.

Information J213 in FIG. 7 indicates the content of the event that occurs first in an interaction between the device to be controlled and the user 992. Specifically, the information J213 indicates that, in the event that occurs first in an interaction between the device to be controlled and the user 992, the utterance "hello" is produced from the entity indicated by the information J212. The information J213 in FIG. 7 is an example of content information.

The information J22 indicates an event that occurs second in an interaction between the device to be controlled and the user 992. Information J221 indicates that the information J22 is information relating to an event that occurs second in an interaction between the device to be controlled and the user 992. The information J221 in FIG. 7 is an example of turn information. Information J222 in FIG. 7 indicates that the user 992 is the entity of the event that occurs second in an interaction between the device to be controlled and the user 992. The information J222 in FIG. 7 is an example of executing entity information.

Information J223 in FIG. 7 indicates the content of the event that occurs second in an interaction between the device to be controlled and the user 992. Specifically, the information J223 indicates that, in the event that occurs second in an interaction between the device to be controlled and the user 992, the utterance "how are you" is produced from the entity indicated by the information J222. The information J223 in FIG. 7 is an example of content information.

Returning to the description of FIG. 1, the assistance device 1 is communicably connected to the management device 2 through a network 901. The management device 2 is provided with a control unit 21 and a storage unit 22. The control unit 21 is provided with a processor such as a central processing unit (CPU) and a memory connected by a bus. The control unit 21 controls operations of each functional unit provided in the management device 2. The management device 2 is communicably connected to the assistance device 1 through the network 901. The management device 2 acquires interaction flow information generated by the assistance device 1 through the network 901, and records the acquired interaction flow information in the storage unit 22. The process of acquiring the interaction flow information and the process of recording the acquired interaction flow information in the storage unit 22 are executed by the control unit 21.

The management device 2 is communicably connected to the conversation control device 3 through a network 902.

The conversation control device 3 controls operations of the device to be controlled, such as the operated device 994, according to a received utterance outputted by the user 992, based on interaction flow information generated by the assistance device 1. More specifically, the conversation control device 3 acquires text data indicating a received utterance outputted by the user 992, and causes the device to be controlled to execute operations according to the interaction flow information based on of the acquired text data.

The conversation control device 3 acquires interaction flow information from the management device 2 through the network 902. The conversation control device 3 causes the device to be controlled to execute operations according to the interaction flow information based on the acquired text data by controlling the operations of the operated device 994 through a network 903. The conversation control device 3 acquires text data from the operating terminal 993 through the network 903.

The operating terminal 993 receives the input of a received utterance from the user 992. The operating terminal 993 converts the inputted received utterance into text data. The operating terminal 993 transmits the text data generated by the conversion to the conversation control device 3 through the network 903. The operating terminal 993 is a personal computer that can execute a process for converting an inputted received utterance into text data, for example.

The operating terminal 993 may be anything that can receive the input of a received utterance from the user 992 and convert the inputted received utterance into text data. The operating terminal 993 may be a mobile phone or a smartphone, for example. The operating terminal 993 may also be a device including a function of an artificial intelligence (AI) assistant, such as a smart speaker, for example. The operating terminal 993 does not necessarily need to be implemented in a housing different from the operated device 994, and may be integrated.

The method by which the user 992 inputs a received utterance into the operating terminal 993 may be any method capable of converting a received utterance into text data. The method by which the user 992 inputs a received utterance into the operating terminal 993 may be a method of executing a social networking service (SNS) app executable by the operating terminal 993 and inputting a received utterance using the running SNS app, for example. For instance, input may be performed by having the user 992 produce speech corresponding to the received utterance. In this case, a speech recognition process is performed, and the speech produced by the user 992 is converted into text data and inputted into the operating terminal 993.

Figure 8:
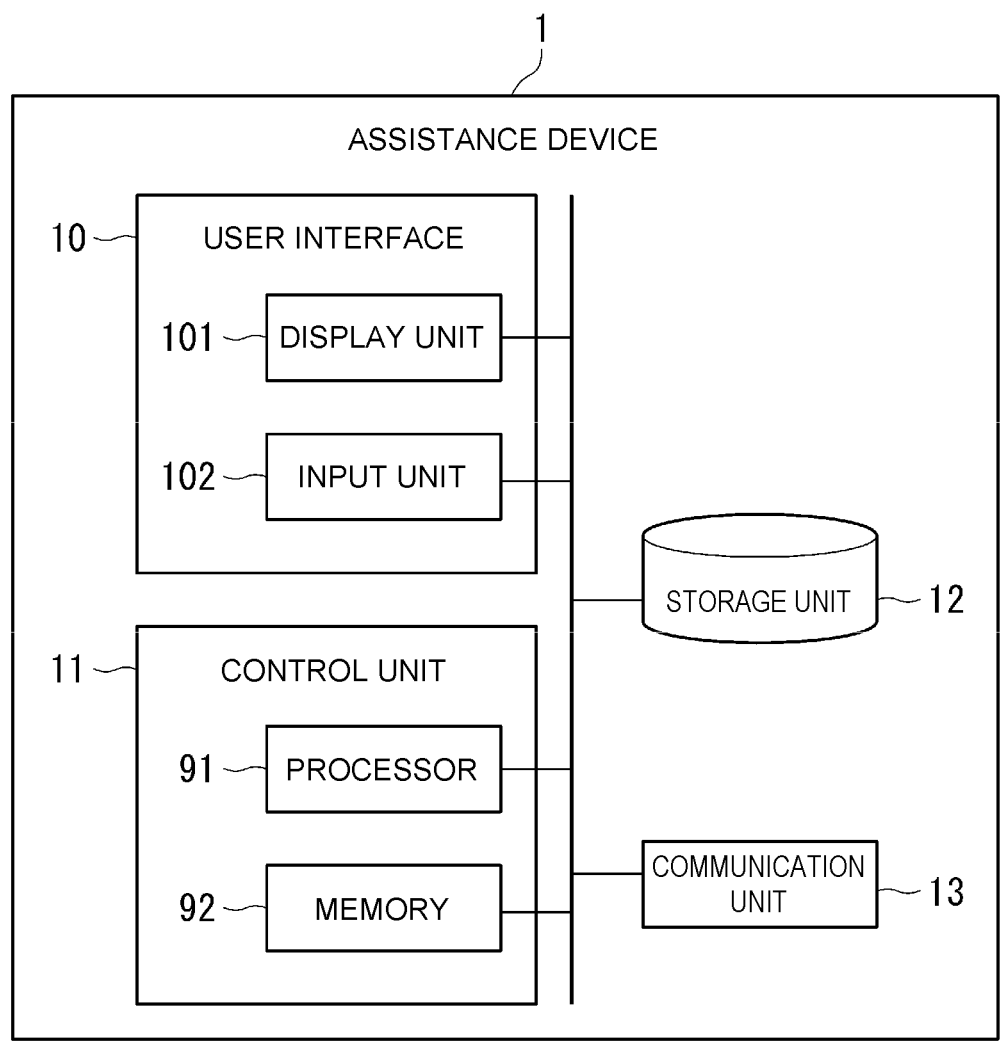
FIG. 8 is a diagram illustrating an example of a hardware configuration of an assistance device 1 in the embodiment.

FIG. 8 is a diagram illustrating an example of a hardware configuration of the assistance device 1 in the embodiment. The assistance device 1 is provided with a control unit 11 provided with a processor 91 such as a central processing unit (CPU) and a memory 92 connected by a bus, and executes a program. Through the execution of a program, the assistance device 1 functions as a device provided with a user interface 10, the control unit 11, a storage unit 12, and a communication unit 13.

More specifically, in the assistance device 1, the processor 91 reads out a program stored in the storage unit 12 and stores the read-out program in the memory 92. By having the processor 91 execute the program stored in the memory 92, the assistance device 1 functions as a device provided with the user interface 10, the control unit 11, the storage unit 12, and the communication unit 13.

The user interface 10 is provided with a display unit 101 and an input unit 102. The display unit 101 and the input unit 102 may be implemented as separate devices, but may also be implemented as an integrated device, like a touch panel, for example. The control unit 11 controls operations of each functional unit provided in the assistance device 1. The control unit 11 generates interaction flow information, for example.

The storage unit 12 is made up of a computer-readable storage medium device such as a magnetic hard disk device or a semiconductor memory device. The storage unit 12 stores various information related to the assistance device 1. The storage unit 12 stores various information generated as a result of a process executed by the control unit 11, for example. The storage unit 12 stores interaction flow information generated by the control unit 11, for example. The storage unit 12 stores in advance image data of a screen (hereinafter referred to as the "initial screen") before any of a received utterance, a given utterance, and the response process execution information are inputted into the input unit 102 on the screen illustrated in FIG. 2 or the like, for example.

The communication unit 13 is configured to include a communication interface for connecting the assistance device 1 to an external device. The communication unit 13 communicates with the external device through the network 901 in a wired or wireless manner. The external device is the management device 2, for example.

Figure 9:
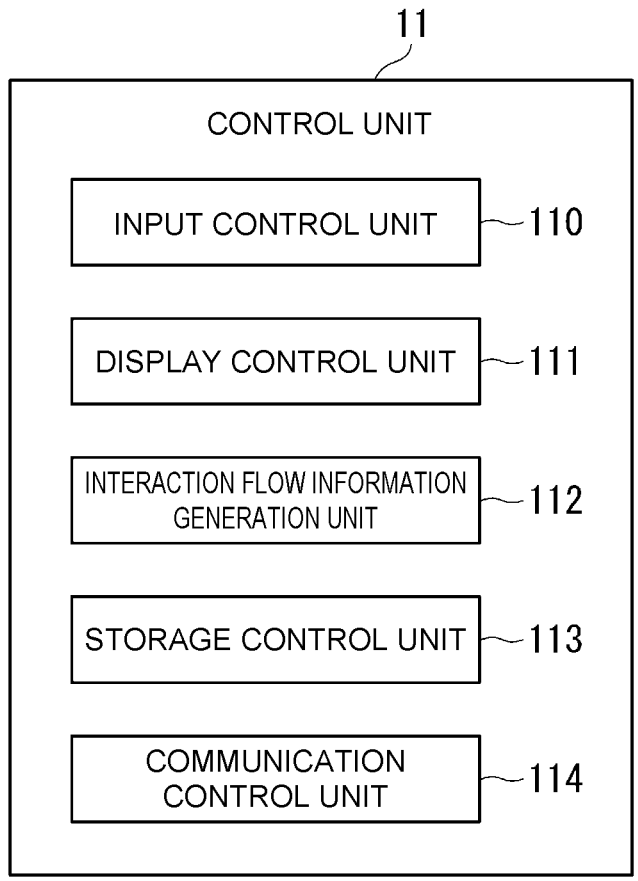
FIG. 9 is a diagram illustrating an example of a functional configuration of a control unit 11 in the embodiment.

FIG. 9 is a diagram illustrating an example of a functional configuration of the control unit 11 in the embodiment. The control unit 11 is provided with an input control unit 110, a display control unit 111, an interaction flow information generation unit 112, a storage control unit 113, and a communication control unit 114.

The input control unit 110 controls operations of the input unit 102.

The display control unit 111 controls operations of the display unit 101. The display control unit 111 executes an initial screen display process, for example. The initial screen display process is a process of reading out image data of the initial screen stored in the storage unit 12 and displaying the initial screen on the display unit 101.

The display control unit 111 executes a received utterance display process, for example. The received utterance display process is a process of causing the display unit 101 to display a received utterance inputted into the input unit 102.

The display control unit 111 executes a prompt information display process, for example. The prompt information display process is a process that, in the case where information indicating an event that has the possibility of occurring in the (N−1)th place during a human-device conversation is inputted into the input unit 102, causes the display unit 101 to display information prompting for the input of information indicating an event that has the possibility of occurring in the Nth place during the human-device conversation. Note that the information indicating each event may also be removed individually or inserted partway through.

An example of a change of the screen displayed by the display unit 101 due to the execution of both the received utterance display process and the prompt information display process is the change from the screen illustrated in FIG. 3 to the screen illustrated in FIG. 4. The change from the screen illustrated in FIG. 5 to the screen illustrated in FIG. 6 is another example of a change of the screen displayed by the display unit 101 due to the execution of both the received utterance display process and the prompt information display process.

The display control unit 111 executes a response process candidate display process, for example. The response process candidate display process is a process that causes the display unit 101 to display a response process candidate indicated by inputted response process candidate information in the case where the response process candidate information has been inputted into the input unit 102.

An example of a change of the screen displayed by the display unit 101 due to the execution of both the response process candidate display process and the prompt information display process is the change from the screen illustrated in FIG. 4 to the screen illustrated in FIG. 5.

The display control unit 111 executes a given utterance display process, for example. The given utterance display process is a process of causing the display unit 101 to display a given utterance inputted into the input unit 102.

An example of a change of the screen displayed by the display unit 101 due to the execution of both the given utterance display process and the prompt information display process is the change from the screen illustrated in FIG. 2 to the screen illustrated in FIG. 3.

The interaction flow information generation unit 112 generates interaction flow information based on information inputted into the input unit 102.

The storage control unit 113 records various information produced by the control unit 11 in the storage unit 12. The storage control unit 113 records interaction flow information generated by the control unit 11 in the storage unit 12, for example. The storage control unit 113 records information inputted into the input unit 102 (that is, information acquired by the input control unit 110) in the storage unit 12, for example.

The communication control unit 114 controls operations of the communication unit 13. The communication control unit 114 controls operations of the communication unit 13 to transmit interaction flow information to the management device 2, for example. The management device 2 receives and records the transmitted interaction flow information in the storage unit 22.

Figure 10:
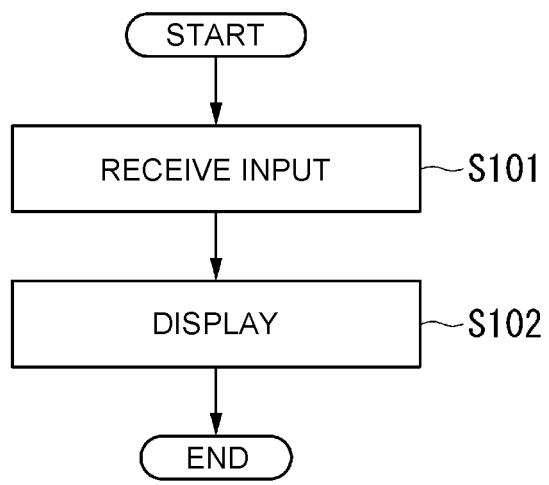
FIG. 10 is a flowchart illustrating an example of a flow of processes executed by the assistance device 1 according to an embodiment.

FIG. 10 is a flowchart illustrating an example of a flow of processes executed by the assistance device 1 according to an embodiment. Information is inputted into the input unit 102 (step S101). Next, the display control unit 111 executes one of the received utterance display process, the response process candidate display process, or the given utterance display process according to the inputted information, thereby causing the display unit 101 to display the inputted information and also executing the prompt information display process (step S102). Due to the process in step S102, the display unit 101 displays the inputted information and information prompting for the input of information indicating an event that has the possibility of occurring next during a human-device conversation after the occurrence of the event that produced the inputted information.

Figure 11:
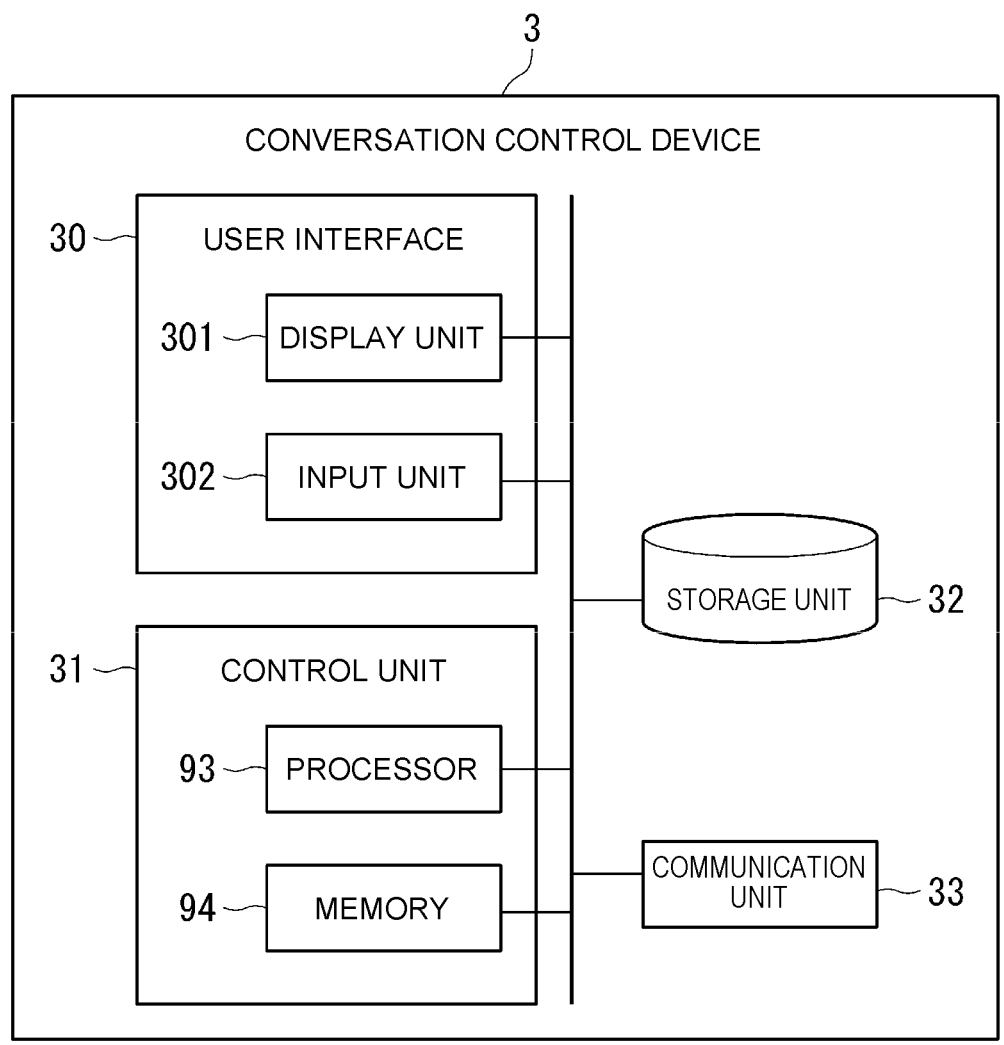
FIG. 11 is a diagram illustrating an example of a hardware configuration of a conversation control device 3 in the embodiment.

FIG. 11 is a diagram illustrating an example of a hardware configuration of the conversation control device 3 in the embodiment. The conversation control device 3 is provided with a control unit 31 provided with a processor 93 such as a CPU and a memory 94 connected by a bus, and executes a program. Through the execution of the program, the conversation control device 3 functions as a device provided with a user interface 30, the control unit 31, a storage unit 32, and a communication unit 33.

More specifically, in the conversation control device 3, the processor 93 reads out a program stored in the storage unit 32 and stores the read-out program in the memory 94. By having the processor 93 execute the program stored in the memory 94, the conversation control device 3 functions as a device provided with the user interface 30, the control unit 31, the storage unit 32, and the communication unit 33.

The user interface 30 is provided with a display unit 301 and an input unit 302. The display unit 301 is configured to include a display device such as a CRT display, a liquid crystal display, or an organic EL display. The display unit 301 may also be configured to include an interface that connects these display devices to the conversation control device 3. The input unit 302 is configured to include an input device such as a mouse and keyboard or a touch panel, for example. The input unit 302 may also be configured to include an interface that connects these input devices to the conversation control device 3.

The control unit 31 controls operations of each functional unit provided in the conversation control device 3. The control unit 31 acquires interaction flow information from the management device 2 through the communication unit 33 and the network 902, for example.

The storage unit 32 is made up of a computer-readable storage medium device such as a magnetic hard disk device or a semiconductor memory device. The storage unit 32 stores various information related to the conversation control device 3. The storage unit 32 stores various information generated as a result of a process executed by the control unit 31, for example. The storage unit 32 stores interaction flow information acquired by the control unit 31 from the management device 2 through the communication unit 33, for example. Note that the storage unit 32 may store the interaction flow information in advance before text data indicating a received utterance is acquired by the communication unit 33, or in the reverse order. There are no limitations on the order of storage. Moreover, the information stored in the storage unit 32 may also be stored in another device (for example, the management device 2).

The communication unit 33 is configured to include a communication interface for connecting the conversation control device 3 to an external device. The communication unit 33 communicates with the management device 2 through the network 902 in a wired or wireless manner. The communication unit 33 communicates with the operating terminal 993 and the operated device 994 through the network 903 in a wired or wireless manner. Through communication with the operating terminal 993, the communication unit 33 receives text data indicating a received utterance, for example. Through communication with the operated device 994, the communication unit 33 transmits to the operated device 994 an instruction causing the operated device 994 to execute an operation corresponding to the text data indicating a received utterance, that is, an operation indicated by the interaction flow information, for example. More specifically, for example, a script matching a word inputted in the area A103 (AI Does) is launched, and the text data, the interaction flow information, and the like are passed as arguments of the script. Thereafter, the script ultimately returns several arguments, including the character string in the input field on the right side of the area A103 (AI Does).

Figure 12:
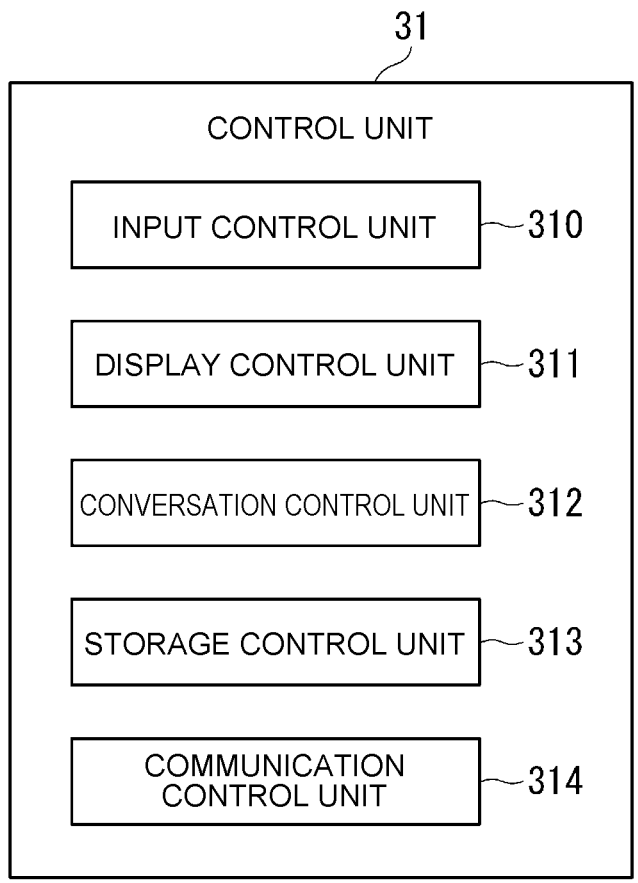
FIG. 12 is a diagram illustrating an example of a functional configuration of a control unit 31 in the embodiment.

FIG. 12 is a diagram illustrating an example of a functional configuration of the control unit 31 in the embodiment. The control unit 31 is provided with an input control unit 310, a display control unit 311, a conversation control unit 312, a storage control unit 313, and a communication control unit 314.

The input control unit 310 controls operations of the input unit 302. The display control unit 311 controls operations of the display unit 301.

The conversation control unit 312 determines an instruction for the operated device 994 based on the interaction flow information and the text data indicating a received utterance inputted into the communication unit 33. For example, in the case where the received utterance indicated by the text data is the utterance "Please play Spring from The Four Seasons by Vivaldi", the conversation control unit 312 determines to instruct the operated device 994 to perform an operation for playing "Spring" from "The Four Seasons" by Vivaldi.

The storage control unit 313 records various information produced by the control unit 31 in the storage unit 32. The storage control unit 313 records, for example, information indicating an instruction to the operated device 994 determined by the control unit 31 in the storage unit 12. The storage control unit 313 records, for example, text data indicating a received utterance acquired through the communication unit 33 in the storage unit 12.

The communication control unit 314 controls operations of the communication unit 33. The communication control unit 314 controls operations of the communication unit 33 to acquire interaction flow information from the management device 2, for example. The communication control unit 314 controls operations of the communication unit 33 to transmit an instruction determined by the conversation control unit 312 to the operated device 994, for example. The communication control unit 314 acquires text data indicating a received utterance through the communication unit 33, for example.

In this way, an instruction determined by the conversation control unit 312 is sent by the communication control unit 314 to the operated device 994 through the communication unit 33. The operated device 994 receiving the instruction performs an operation according to the instruction. Accordingly, the conversation control unit 312 is a functional unit that controls operations of the operated device 994 based on a received utterance. In other words, by controlling operations of the operated device 994, the conversation control unit 312 controls an interaction between the user 992 and the operated device 994.

Figure 13:
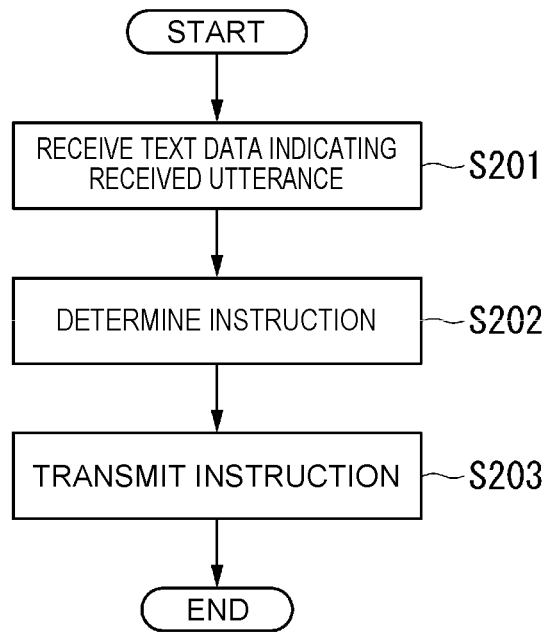
FIG. 13 is a flowchart illustrating an example of a flow of processes executed by the conversation control device 3 according to an embodiment.

FIG. 13 is a flowchart illustrating an example of a flow of processes executed by the conversation control device 3 according to an embodiment. The communication control unit 314 acquires text data indicating a received utterance through the communication unit 33 (step S201). Next, the conversation control unit 312 determines an instruction for the operated device 994 based on the text data indicating a received utterance and the interaction flow information (step S202). The communication control unit 314 transmits the instruction determined by the conversation control unit 312 to the operated device 994 (step S203). Note that there is no restriction that a response process is necessarily performed after a received utterance. A given utterance may also be displayed or another operation may be performed with respect to a received utterance.

The control of step S202 and step S203 is an example of the control of the operated device 994 by the conversation control unit 312. Note that a person or device capable of generating a computer program for controlling the operated device 994 has preprogrammed the operated device 994 based on the interaction flow information such that the operated device 994 performs operations according to instructions.

When a received utterance is inputted into the input unit 102, the assistance device 1 in the embodiment configured in this way causes the display unit 101 to display the inputted received utterance. Furthermore, the assistance device 1 also displays information prompting for the input of information indicating an event that has the possibility of occurring next. Consequently, the assistance device 1 facilitates understanding of the interaction between the device to be controlled and the user 992 by the designer 991 who uses the assistance device 1. Consequently, the assistance device 1 can lessen the burden of the labor required to implement a technology of interaction between a device and a person.

Also, as described using FIGS. 2 to 6, the assistance device 1 displays a received utterance inputted into the input unit 102 on the display unit 101, and also displays information prompting for the input of information indicating an event that has the possibility of occurring next. The assistance device 1 thereby assists with the expression of ideas by the designer 991. Consequently, the designer 991 does not need to input computer program code into the assistance device 1. The information that the designer 991 inputs into the assistance device 1 may be utterances exchanged in an interaction between the device to be controlled and the user 992 and information indicating the content of a process executed by the device to be controlled (which may be different from the above-described device to be controlled).

Using only the utterances exchanged in an interaction between the device to be controlled and the user 992 and the information indicating the content of a process executed by the device to be controlled, the designer 991 can express what they want to achieve with the computer program. The information generated by the assistance device 1 may be implemented by a person (for example, a different person from the designer 991) who has the skills to implement the information in the device to be controlled, or may be implemented by a device that generates a computer program based on interaction flow information. Consequently, the assistance device 1 can lessen the burden of the labor required to implement a technology of interaction between a device and a person. Note that a program that manages an interaction between a human and a device (for example, an interaction between the user 992 and the operating terminal 993) may be implemented in advance in the conversation control device 3. In addition, by defining in the operating terminal 993 an interaction newly generated by the assistance device 1, the operating terminal 993 may operate so as to enact the defined interaction. Moreover, when a new operating terminal 993 is added, obviously a control program for the new operating terminal 993 is necessary. For such a new operating terminal 993, the interaction generated by the assistance device 1 may not necessarily be needed by the control program. In this case, an interaction is enacted by predefined content in a control program installed in the operating terminal 993.

Note that, as described above, the interaction flow information is text data. For this reason, the assistance system 100 can enable the control of the operated device 994 by the user 992 irrespectively of the application that the operating terminal 993 executes or the specifications of the operated device 994.

Application Examples

<Application to Medicine>

The assistance system 100 is used so that the user 992 obtains information about medicine more accurately, for example. Information about medicine can be obtained by searching the Internet for the name of the medicine, for example. However, the information retrieved from an Internet search may simply be a displayed list of any side effects, for example, and in some cases, it may not be easy to obtain information about the side effects of taking multiple medicines together. As a result, the user 992 may obtain incorrect information about medicine in some cases.

If the assistance system 100 is used, information about medicine can be obtained more accurately. This feature will be explained.

In the case where the assistance system 100 is used to provide information about medicine, the device to be controlled is a device that can output descriptions of medicine, for example. A device that can output descriptions of medicine is a smart speaker, for example. The user 992 uses the operating terminal 993, such as a smartphone that can scan a two-dimensional barcode, to scan a two-dimensional barcode attached in advance to a container of medicine. The smartphone may transmit the scanned information to the smart speaker by wired communication or wireless communication, for example. The user 992, by scanning the two-dimensional barcode with the operating terminal 993, can communicate with the device to be controlled through the operating terminal 993. In this way, the two-dimensional barcode indicates information for communicating with the device to be controlled.

A two-dimensional barcode does not necessarily need to be attached to the container of medicine, nor does the operating terminal 993 used by the user 992 need to be a smartphone. Information enabling communication with the device to be controlled may be marked in any way on the container of medicine. Moreover, the operating terminal 993 may be any kind of terminal that can acquire information attached to the container of medicine, communicate with the device to be controlled, and convert a received utterance inputted from the user 992 into text data.

The user 992 who has initiated communication with the device to be controlled inputs an utterance asking for information about medicine as the received utterance into the operating terminal 993. The utterance asking for information about medicine is, for example, the utterance of the question "User 992 is taking medicine A, medicine B, and medicine C three times a day, but is it okay to also take medicine D?" The conversation control device 3 acquires text data indicating the received utterance inputted into the operating terminal 993. The conversation control device 3 controls operations of the operated device 994 based on the acquired text data and interaction flow information generated in advance by the assistance device 1.

More specifically, the conversation control unit 312 of the conversation control device 3 controls operations of the operated device 994 based on the text data indicating the received utterance and interaction flow information generated in advance by the assistance device 1. For example, in the case where the received utterance is the above utterance of the question "User 992 is taking medicine A, medicine B, and medicine C three times a day, but is it okay to also take medicine D?", the conversation control unit 312 instructs the operated device 994 with the following medicine determination instruction. The medicine determination instruction is an instruction for executing a process of determining whether it is okay for the user 992 to also take the medicine D and for executing a process of outputting an utterance indicating the result of the determination.

More specifically, operations may be performed as follows. The operated device 994 returns two different texts to the conversation control device 3. For example, if the text is "talkdoctor", in the next step, the given utterance is "Talk to a doctor. Shall I look for one nearby?", guiding the user 992 to a conversation of a doctor search. If the text is "noproblem", the given utterance is "That's fine". Thereafter, the question "Would you like to participate in a survey?" is asked, and a survey is started.

The operated device 994, following the instruction from the conversation control unit 312, determines whether it is okay for the user 992 to also take the medicine D, and outputs an utterance indicating the result of the determination.

The interaction flow information used in such a process for responding with information about medicine is information that the designer 991 has generated in advance using the assistance device 1. The designer 991 inputs a question related to information about medicine as the received utterance into the input unit 102, for example. The display control unit 111 displays the inputted received utterance on the display unit 101 by executing the received utterance display process, and executes the prompt information display process. Next, the designer 991 inputs a process to be executed by the device to be controlled with respect to the received utterance. The display control unit 111 displays the inputted process on the display unit 101 and also executes the prompt information display process. Subsequently, the designer 991 inputs the given utterance to be outputted by the device to be controlled. The display control unit 111 displays the inputted given utterance on the display unit 101.

The interaction flow information generation unit 112 generates medicine flow information based on the information inputted into the input unit 102. The medicine flow information is text data information indicating the flow of events occurring in a medicine-related interaction between the user 992 and the device to be controlled. In other words, the medicine flow information is a type of interaction flow information.

The medicine flow information indicates that, for example, the received utterance inputted into the input unit 102 is an utterance outputted by the user 992 in the first event of the medicine-related interaction between the user 992 and the device to be controlled. The medicine flow information indicates that, for example, the process inputted next into the input unit 102 is a process to be executed by the device to be controlled in the next event after the first event of the medicine-related interaction between the user 992 and the device to be controlled. The medicine flow information indicates that, for example, the given utterance inputted into the input unit 102 is an utterance outputted by the device to be controlled in a third event of the medicine-related interaction between the user 992 and the device to be controlled.

A person or device capable of using the generated medicine flow information to generate a computer program for controlling the device to be controlled programs operations of the device to be controlled so as to follow the flow of events indicated by the medicine flow information. Consequently, the device to be controlled operates so as to follow the flow indicated by the medicine flow information.

In this way, the assistance system 100 can be used to provide information about medicine. When used for information on the provision of medicine, the user 992 can obtain more accurate information compared to searching for information about medicine by themself. Note that when generating the medicine flow information, a given utterance recommending a diagnosis by a doctor if a predetermined condition is fulfilled may also be inputted by the designer 991. In such a case, the device to be controlled can output a given utterance recommending a diagnosis by a doctor, depending on the question by the user 992.

<Application to Vehicle Technology>

The assistance system 100 may also be applied to vehicle technology, for example. When applied to mobility as a service (MaaS)/vehicle technology, the user 992 is a tourist, for example, and the device to be controlled is a communication robot that provides tourism guidance. Text data information (hereinafter referred to as "tourism flow information") indicating a flow of events in an interaction between a tourist and a communication robot is generated by the designer 991 in advance using the assistance device 1. The tourism flow information is a type of interaction flow information.

When generating tourism flow information, the designer 991 inputs into the input unit 102 an utterance that a tourist is anticipated to ask as a received utterance. On the display unit 101, the received utterance is displayed and the result of the execution of the prompt information display process is also displayed. Next, the designer inputs into the input unit 102 a given utterance indicating an answer to the received utterance. On the display unit 101, the given utterance is displayed and the result of the execution of the prompt information display process is also displayed.

The interaction flow information generation unit 112 generates tourism flow information. The tourism flow information indicates that, for example, the received utterance inputted into the input unit 102 is a received utterance outputted by the tourist in the first event of an interaction between the tourist and the communication robot. The tourism flow information indicates that, for example, the given utterance inputted into the input unit 102 is a given utterance outputted by the communication robot in the next event after the first event of the interaction between the tourist and the communication robot.

The received utterance outputted by the tourist may be, for example, the utterance "How tall is Tokyo Tower in meters?" In such a case, the given utterance outputted by the communication robot is "Tokyo Tower is 333 meters tall". The received utterance outputted by the tourist may also be the utterance "I want to go to the station". In such a case, the given utterance outputted by the communication robot may be, for example, the utterance of the question "Do you want to go to Yotsuya Station, or do you want to go to Shinjuku Station?". In the case where there is a reply to such a question, the reply may be inputted into a navigation device corresponding to the operated device 994. Thereafter, the interaction between the user 992 and the navigation device may be controlled.

In the case where the communication robot is installed on a bus or the like and passes through a predetermined, specific place, the communication robot may also output the given utterance "You can see Tokyo Tower on your left", for example.

In the case of using the assistance device 1 as described above, the designer 991 only has to input the desired utterance to be outputted by the device to be controlled and the content of a process. Accordingly, by using the assistance device 1, even someone who is unfamiliar with the computer program can change the utterance to be outputted by the communication robot.

Note that the language inputted into the assistance device 1 is not limited to a specific language, and input may be provided in any language. Furthermore, the inputted language may also be translated into another language using natural language processing technology. In such a case, even if the designer 991 has provided input in a single language, the device to be controlled can output utterances in multiple languages. Mapping to another language may also be performed instead of translation. Mapping is not mere translation, and is performed by the execution of linguistic processing according to the other language.

Consequently, in the case where the assistance system 100 is used for tourism guidance, a sudden disaster such as an earthquake occurs, and an evacuation route must be conveyed to tourists of different nationalities on the spot, the assistance system 100 makes it easy to convey the evacuation route. This is because if the designer 991 inputs the evacuation route in a specific language into the assistance device 1, the utterance is translated into multiple languages and outputted from the communication robot.

<Application to Management of Robot>

The assistance system 100 may also be applied to the management of a robot. As an example, an application of the assistance system 100 to the management of a robot will be described using a case in which the robot is provided with a movable arm.

Suppose that the user 992 is an administrator of the robot and that the administrator has inputted the received utterance "Move arm #2 up" into the operating terminal 993, for example. The device to be controlled, namely the robot, operates under control by the conversation control device 3 so as to obey the received utterance. However, depending on the situation, the robot may not necessarily be capable of raising arm #2 up. Accordingly, the robot outputs an utterance indicating whether arm #2 has been moved up as the given utterance. The administrator, by recognizing the given utterance outputted by the robot, can understand the situation of the robot.

Operations may be performed as follows. First, the arm of the robot moves. The operated device 994 outputs the result of the arm movement to the conversation control device 3. This output process may be an operation defined in the area A103. The conversation control device 3 selects a given utterance and transmits the selected given utterance to the operating terminal 993. The operating terminal 993 outputs the received given utterance (by displaying on a screen or reproducing sound, for example). By operating in this way, effects like the above-described are likewise obtained. Furthermore, an effect is also obtained whereby the operated device 994 does not need to communicate directly with the operating terminal 993.

Text data information (hereinafter referred to as "management flow information") indicating a flow of events in an interaction between the administrator and the robot to be managed is generated by the designer 991 in advance using the assistance device 1. The management flow information is a type of interaction flow information.

When generating management flow information, the designer 991 inputs into the input unit 102 an utterance that the administrator is anticipated to ask as a received utterance. On the display unit 101, the received utterance is displayed and the result of the execution of the prompt information display process is also displayed. Next, the designer inputs into the input unit 102 a given utterance to be outputted by the robot to be managed in response to the received utterance. On the display unit 101, the given utterance is displayed and the result of the execution of the prompt information display process is also displayed.

The interaction flow information generation unit 112 generates management flow information. The management flow information may indicate that an operation of the robot is the first event of an interaction between the administrator and the robot to be managed, for example. For example, it is indicated that the received utterance inputted into the input unit 102 is a received utterance outputted by the administrator in the first event of the interaction between the administrator and the robot to be managed. The management flow information indicates that, for example, the given utterance inputted into the input unit 102 is a given utterance outputted by the robot to be managed in the next event after the first event of the interaction between the administrator and the robot to be managed.

The assistance system 100 may also be used for such management of a robot.

<Application to Management of Nursing Care Recipient>

In a long-term care health facility, a nurse may in some cases manage the health of a resident by writing down, in a table on paper, the name of the resident, the nurse's name, the date, the time, and body temperature or other information relating to the health of the resident. However, the work of writing down such information on paper is burdensome. If the assistance system 100 is used, information relating to the health of a resident can be recorded by voice, without writing down the information on paper.

In the case where the assistance system 100 is applied to the management of information relating to the health of a resident, the operating terminal 993 is a device that can receive and convert speech expressing an utterance into text data, such as a voice speaker or a smartphone, for example. Additionally, in the case where the assistance system 100 is applied to the management of information relating to the health of a resident, the operated device 994 is a device that can record text data. The operated device 994 is a computer provided with a storage device such as a hard disk, for example. In the case where the assistance system 100 is applied to the management of information relating to the health of a resident, the nurse is the user 992.

In the case where the assistance system 100 is applied to the management of information relating to the health of a resident, the conversation control device 3 receives text data outputted by the operating terminal 993. The conversation control device 3 controls the operated device 994 based on the received text data and text data information (hereinafter referred to as "nursing care flow information") indicating a flow of events in an interaction between a nurse and the operated device 994. In this case, the operated device 994 may also be a device configured as a database.

The nursing care flow information is a type of interaction flow information.

When generating nursing care flow information, the designer 991 inputs into the input unit 102 an utterance that the nurse is anticipated to produce as a received utterance. On the display unit 101, the received utterance is displayed and the result of the execution of the prompt information display process is also displayed. Next, the designer inputs into the input unit 102 a process to be executed by the operated device 994 with respect to the received utterance. The process to be executed by the operated device 994 is a process of recording a received utterance in a storage device, for example. On the display unit 101, the content of the process is displayed and the result of the execution of the prompt information display process is also displayed.

The interaction flow information generation unit 112 generates nursing care flow information. The nursing care flow information indicates that, for example, the received utterance inputted into the input unit 102 is a received utterance produced by the nurse in the first event of an interaction between the nurse and the operated device 994. The nursing care flow information indicates that, for example, the process inputted into the input unit 102 is a process to be executed by the operated device 994 in the next event after the first event of the interaction between the nurse and the operated device 994. The process to be executed by the operated device 994 in the next event after the first event of the interaction between the nurse and the operated device 994 is a process of recording a received utterance in a storage device, for example.

In such a case, the nurse can record information relating to the health of a resident in the operated device 994 by voice. An utterance indicating information relating to the health of a resident is inputted into the operating terminal 993. The utterance indicating information relating to the health of a resident is an example of a received utterance.

When recording information, information indicating the time at which the information is recorded may also be recorded. The operated device 994 may also output, as a given utterance, an utterance indicating that the information has been recorded. The information recorded in the operated device 994 is also viewable by interested parties such as other nurses and physicians.

The management of information relating to the health of a resident does not need to be performed by voice and may also be performed by the input of characters. Even in such a case, if the utterance produced by the nurse in the case of input by voice and the utterance inputted in the case of input by characters are the same, the text data that the conversation control device 3 receives will be the same.

Note that although an example of the application of the assistance system 100 to a long-term care health facility has been described, the assistance system 100 can be applied similarly to any facility where a nursing care recipient is present. In other words, a resident is an example of a nursing care recipient. For example, the assistance system 100 may be applied as required for users who need to register information in a simplified manner while working.

(Modifications)

An example of application to tourism guidance has been described, but in the assistance system 100, the operated device 994 can support multiple languages even if the designer 991 has generated interaction flow information in a single language, and this is not limited to the example of tourism guidance. By applying natural language processing technology to the assistance system 100, the operated device 994 can support multiple languages even if the designer 991 has generated interaction flow information in a single, specific language.

Since the interaction flow information is text data, in the assistance system 100, accurate translation can be performed and the operated device 994 can output the result of the accurate translation. Moreover, since the conversation control device 3 also handles text data, the operated device 994 can output the result of the accurate translation. Consequently, the designer 991 who uses the assistance device 1 can simply generate interaction flow information in a single language to implement an operated device 994 that supports multiple languages. Note that the process of translation by natural language processing is executed by the interaction flow information generation unit, for example. The process of translation by natural language processing may also be executed by the conversation control unit, for example.

Note that the output of the operated device 994 does not necessarily need to be outputted to the user 992. In the case where the operated device 994 is located in a place distant from the user 992 and a person other than the user 992 is present near the operated device 994, the user 992 can converse with the other person through the operated device 994. For example, in the case where the user 992 has inputted an utterance in a first language using a first application, the inputted language may be translated into a language used by the other person and outputted from the operated device 994 to the other person located near the operated device 994.

Note that the input into the input unit 102 may be the input of characters using an input device such as a keyboard or a touch panel, but may also be input by voice. In addition, the assistance device 1 may also be provided with a device that outputs sound instead of the display unit 101. In such a case, the content that would be outputted by being displayed on the display unit 101 is outputted as sound. Moreover, multiple types of hardware acting as the user interface, such as the input unit 102 and the display unit 101, are applicable. The above may also be changed from one type of hardware to another type of hardware while the designer 991 is in the middle of work. For example, the designer 991 can initially input text using a keyboard and then switch to text input by speech partway through.

Note that the interaction flow information is recorded in storage devices such as the storage unit 12 of the assistance device 1 and the storage unit 22 of the management device 2, and thus is also acquirable by persons other than the designer 991 who generated the interaction flow information.

Also, the conversation control device 3 may transmit a history of interaction between the user 992 and the operated device 994 to the management device 2 in the form of text data to be recorded in the storage unit 22. The recorded history of interaction is viewable by another user. At this time, the user 992 and the other user can view the history of interaction even if the applications used to view the history are different between the user 992 and the other user. This is because the history of interaction is text data.

However, the input of a password may also be required for viewing. If the password is inputted, the person who inputs the password can view the information thereafter without having to input the password.

Note that the assistance system 100, the assistance device 1, the management device 2, and the conversation control device 3 may each be implemented using a plurality of information processing devices communicably connected through a network. Note that some or all of the functions of each of the assistance system 100, the assistance device 1, the management device 2, and the conversation control device 3 may also be achieved using hardware, such as an application-specific integrated circuit (ASIC), a programmable logic device (PLD), or a field-programmable gate array (FPGA). The program may also be recorded on a computer-readable recording medium. The computer-readable recording medium refers to a portable medium such as a flexible disk, a magneto-optical disc, ROM, or a CD-ROM, or a storage device such as a hard disk built into a computer system, for example. The program may also be transmitted over an electrical communication channel.

Note that the assistance device 1 is an example of a computer program generation assistance device. Note that the designer 991 is an example of an output source. Note that the input of information into the input unit 102 does not necessarily need to be performed by a human being such as the designer 991, and may also be performed automatically by a device preprogrammed with the information to be inputted. Note that the display unit 101 is an example of an output unit. Note that the display control unit 111 is an example of an output control unit.

The foregoing describes an embodiment of the present invention in detail and with reference to the drawings. However, specific configurations are not limited to this embodiment, and also include designs and the like within a scope that does not depart from the gist of the present invention.

REFERENCE SIGNS LIST 100 assistance system
1 assistance device
2 management device
3 conversation control device
10 user interface
11 control unit
12 storage unit
13 communication unit
101 display unit
102 input unit
110 input control unit
111 display control unit
112 interaction flow information generation unit
113 storage control unit
114 communication control unit
30 user interface
31 control unit
32 storage unit
33 communication unit
301 display unit
302 input unit
310 input control unit
311 display control unit
312 conversation control unit
313 storage control unit
314 communication control unit
91 processor
92 memory
93 processor
94 memory

The invention claimed is:

1. An assistance device that assists with an implementation of operations of a device to be controlled, the assistance device comprising:
an output control unit that controls operations of an output unit that outputs an utterance inputted into an input unit that receives an input of an utterance which is information outputted by an output source, wherein
in a case in which information indicating an event that has a possibility of occurring in a human-device conversation, that is, an interaction between the device to be controlled and a user of the device to be controlled, is inputted, the output control unit causes the output unit to output an event indicating the inputted information, and
in a case in which information indicating an event that has a possibility of occurring in an (N−1)th place (where N is an integer equal to or greater than 1) during the human-device conversation is inputted into the input unit, the output control unit causes the output unit to output information prompting for an input of information indicating an event that has a possibility of occurring in the Nth place during the human-device conversation,
one event that has a possibility of occurring in the human-device conversation is a response process execution event that is an event in which the device to be controlled executes a response process that is a process according to an utterance inputted into the input unit, and
the output unit displays information related to a candidate of the response process execution event in natural language.

2. The assistance device according to claim 1, wherein other events that have a possibility of occurring in the human-device conversation are a received utterance occurrence event that is an event in which the user inputs an utterance into the device to be controlled and a given utterance occurrence event that is an event in which the device to be controlled outputs an utterance.

3. The assistance device according to claim 1, further comprising:
an interaction flow information generation unit that generates, based on information inputted into the input unit, interaction flow information that is text data information indicating a flow of events occurring in the human-device conversation.

4. A conversation control device comprising:
a conversation control unit that controls an interaction between a user of a device to be controlled and the device to be controlled by using interaction flow information that is text data information indicating a flow of events occurring in a human-device conversation, that is, an interaction between the device to be controlled and the user of the device to be controlled, based on information inputted into an input unit that receives an input of an utterance which is information outputted by an output source, the interaction flow information being information generated by a computer program generation assistance device that assists with a design of operational content of the device to be controlled, the assistance device comprising an output control unit that controls operations of an output unit that outputs an utterance inputted into the input unit, wherein, in a case in which information indicating an event that has a possibility of occurring in the human-device conversation is inputted, the output control unit causes the output unit to output an event indicating the inputted information, and in a case in which information indicating an event that has a possibility of occurring in an (N−1)th place (where N is an integer equal to or greater than 1) during the human-device conversation is inputted into the input unit, the output control unit causes the output unit to output information prompting for an input of information indicating an event that has a possibility of occurring in the Nth place during the human-device conversation, one event that has a possibility of occurring in the human-device conversation is a response process execution event that is an event in which the device to be controlled executes a response process that is a process according to an utterance inputted into the input unit, and the output unit displays information related to a candidate of the response process execution event in natural language.

5. A non-transitory computer readable medium causing a computer program to function as the assistance device according to any one of claim 1.

* * * * *